(12) United States Patent
Sung

(10) Patent No.: US 9,764,788 B1
(45) Date of Patent: Sep. 19, 2017

(54) COMPOUND VIBRATION ABSORPTION ASSEMBLY FOR BIKE SADDLE

(71) Applicant: DDK GROUP CO., LTD. TAIWAN BRANCH (BRUNEI), Taipei (TW)

(72) Inventor: Ying-Chiao Sung, Taipei (TW)

(73) Assignee: DDK Group Co., Ltd., Taiwan Branch (Brunei), Taipei (TW)

( * ) Notice: Subject to any disclaimer, the term of this patent is extended or adjusted under 35 U.S.C. 154(b) by 0 days.

(21) Appl. No.: 15/165,082

(22) Filed: May 26, 2016

(30) Foreign Application Priority Data

Apr. 22, 2016 (TW) .............................. 105205715 U

(51) Int. Cl.
*B62J 1/06* (2006.01)
*F16F 3/10* (2006.01)

(52) U.S. Cl.
CPC .. *B62J 1/06* (2013.01); *F16F 3/10* (2013.01)

(58) Field of Classification Search
CPC ........ B62J 1/06; B62J 1/02; F16F 3/10; F16F 1/04
USPC ................... 267/140.4, 64.19, 64.23, 64.27; 297/195.1, 208, 209, 210
See application file for complete search history.

(56) References Cited

U.S. PATENT DOCUMENTS

| | | | | |
|---|---|---|---|---|
| 5,236,170 A * | 8/1993 | Johnsen | .................... | B62J 1/06 248/219.2 |
| 5,507,476 A * | 4/1996 | Lin | ........................ | B62J 1/02 267/132 |
| 5,775,710 A * | 7/1998 | Yu | ............................. | B62J 1/08 280/283 |
| 5,855,410 A * | 1/1999 | Lin | ........................... | B62J 1/00 248/219.2 |
| 5,927,738 A * | 7/1999 | Kesinger | .................. | B62J 1/06 280/220 |
| 6,260,918 B1 * | 7/2001 | Lee | ............................ | B62J 1/02 297/195.1 |
| 6,443,524 B1 * | 9/2002 | Yu | ............................. | B62J 1/02 297/195.1 |
| 6,773,061 B1 * | 8/2004 | Shu | ........................... | B62J 1/02 297/195.1 |
| 7,093,894 B2 * | 8/2006 | Yu | ............................. | B62J 1/02 297/200 |
| 7,523,568 B2 * | 4/2009 | Willey | ................... | E01H 5/063 37/231 |
| 2009/0230743 A1 * | 9/2009 | Derakhshan | ........... | A47C 9/002 297/329 |
| 2010/0164260 A1 * | 7/2010 | Segato | ...................... | B62J 1/02 297/199 |

* cited by examiner

*Primary Examiner* — Thomas J Williams
*Assistant Examiner* — Mariano Sy
(74) *Attorney, Agent, or Firm* — Rosenberg, Klein & Lee

(57) ABSTRACT

A compound vibration absorption assembly is provided for a bike saddle, which includes a pair of compound vibration-absorption units mounted to a bottom of the saddle. Each of the compound vibration-absorption units includes an exterior enclosure barrel and an interior elastic component. The interior elastic component is received and housed in an interior space of the exterior enclosure barrel along a force applying direction. When a force is applied to the saddle, a part of the force is absorbed by the interior elastic component, while a remaining part of the force is simultaneously absorbed by the exterior enclosure barrel.

5 Claims, 4 Drawing Sheets

COMPOUND VIBRATION ABSORPTION ASSEMBLY FOR BIKE SADDLE

BACKGROUND OF THE INVENTION

1. Field of the Invention

The present invention relates to a mechanical vibration absorption structure, and in particular to a compound vibration absorption structure for a bike saddle.

2. The Related Arts

Cycling is prevailing nowadays. All sorts of accessory have been widely used and have also been made in a more professional manner. In a conventional design of a bike saddle, to prevent a rider from receiving violent shocks and vibration during cycling, mostly, a pair of helical springs is provided under the saddle to serve as a primary component for vibration absorption. Such a design is generally inconvenient for assembling and a large amount of human labor is needed. Further, in actual uses, the helical springs may get expanded when acted upon by external forces, and this leads to expansion of the gap between adjacent turns of the spring, which may receive and pinch and thus damage human fingers. In addition, such helical springs are not covered and are exposed to the surrounding environment, dust may readily attach thereto.

To cope with such an issue, of the conventional helical springs, some manufacturers uses vibration absorption blocks, which are made of rubber materials or plastic materials and are mounted under the saddle to serve as a component for vibration absorption. This simplifies the assembling and also eliminates the potential risk of pinching fingers; however, this component provides only a poor effect of vibration absorption in actual uses.

SUMMARY OF THE INVENTION

Thus, in view of the above drawbacks of the conventional vibration absorption structure of a bike saddle, the primary object of the present invention is to provide a compound vibration absorption structure of a bike saddle that provides a bicycle rider with an improved effect of vibration absorption.

The technical solution that the present invention adopts to overcome the prior art issues is that a pair of compound vibration-absorption units are provided and mounted to a bottom of a saddle. Each of the compound vibration-absorption units comprises an exterior enclosure barrel and an interior elastic component, wherein the interior elastic component is received and housed in an interior space of the exterior enclosure barrel. When a force is applied to the saddle, a part of the force is absorbed by the interior elastic component, while a remaining part of the force is simultaneously absorbed by the exterior enclosure barrel.

In the above arrangement, the abutting zone of the saddle comprises an inner annular wall and an outer annular wall. The outer annular wall is formed along an outer circumference of the inner annular wall, and an annular positioning trough is formed between the outer circumference of the inner annular wall and the outer annular wall. The interior elastic component has an end received and retained in the annular positioning trough, and the exterior enclosure barrel has an end positioned around and abutting an outer circumference of the outer annular wall.

In the above arrangement, the compound vibration-absorption units are each positioned and coupled between the abutting zone of the saddle and the support base by means of a coupling assembly. The coupling assembly comprises: a projection post, which is formed in and projecting from the abutting zone of the saddle with a threaded hole formed in the projection post; a through hole, which is formed through the support base and corresponds to the projection post; and a fastener, which is received through the through hole to engage the threaded hole of the projection post so as to securely position and retain the compound vibration-absorption unit between the support base and the abutting zone of the saddle.

In the above arrangement, the interior elastic component comprises a helical coil spring.

In the above arrangement, the second open end of the exterior enclosure barrel is provided with and combined with an abutting ring, and the interior elastic component is supported between the abutting zone of the saddle and the abutting ring.

In the above arrangement, the exterior enclosure barrel is formed of one of rubber material and plastic material.

In respect of efficacy, the present invention provides a compound vibration absorption assembly for used with a bike saddle, wherein when a force is applied to the saddle, a part of the force is absorbed by an interior elastic component, while a remaining part of the force is simultaneously absorbed by an exterior enclosure barrel thereby improving the comfort of a bicycle rider.

The present invention comprises a helical coil spring to function as an interior elastic component. The helical coil spring is covered by and housed in an exterior enclosure barrel so that the exterior enclosure barrel may function as a protection component to prevent a user's finger from directly contacting the interior elastic component thereby eliminating the potential risk of being pinched. In addition, the helical coil spring is also protected against dust attaching thereto.

In respect of visual effect, the exterior enclosure barrel can be made in various forms or colors in order to improve commercial value thereof.

Further, in respect of assembly, the helical coil spring and the exterior enclosure barrel can be combined as a unitary module so that a subsequent assembly operation would be easy and efficient.

BRIEF DESCRIPTION OF THE DRAWINGS

The present invention will be apparent to those skilled in the art by reading the following description of preferred embodiments of the present invention, with reference to the attached drawings, in which.

DETAILED DESCRIPTION OF THE PREFERRED EMBODIMENTS

Figure 1:
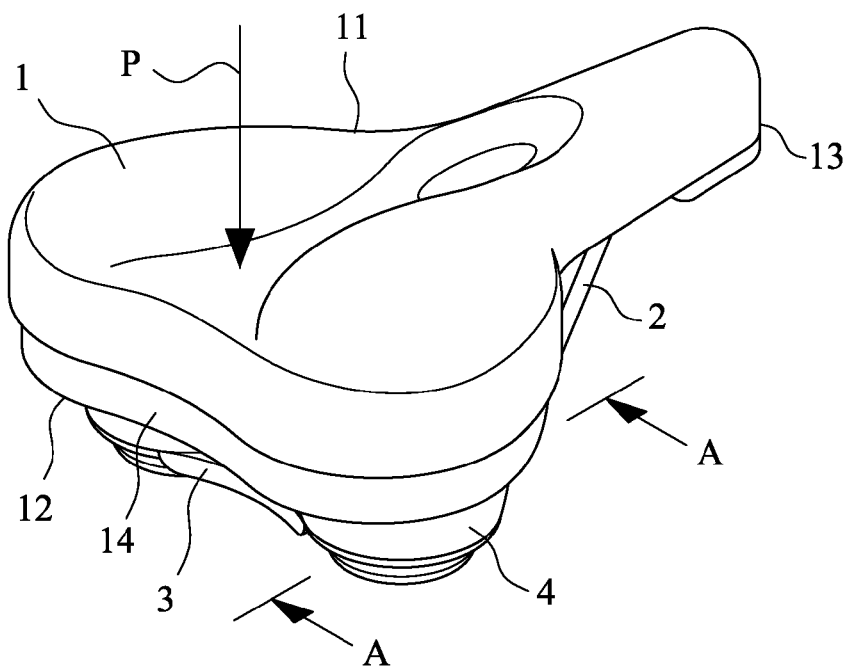
FIG. 1 is a rear-side perspective view of the present invention.
Figure 2:
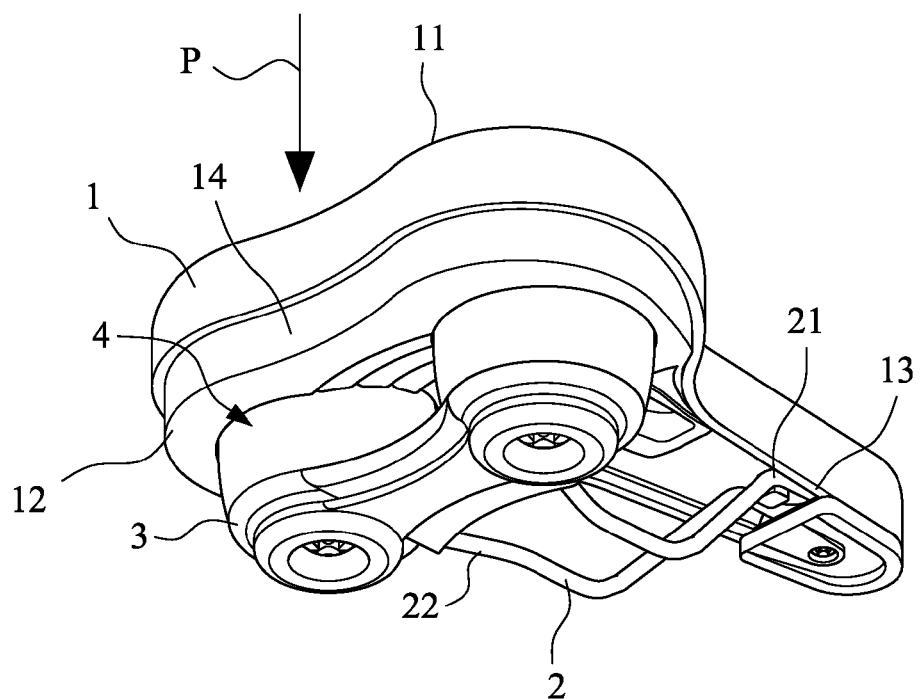
FIG. 2 is a bottom-side perspective view of the present invention.
Figure 3:
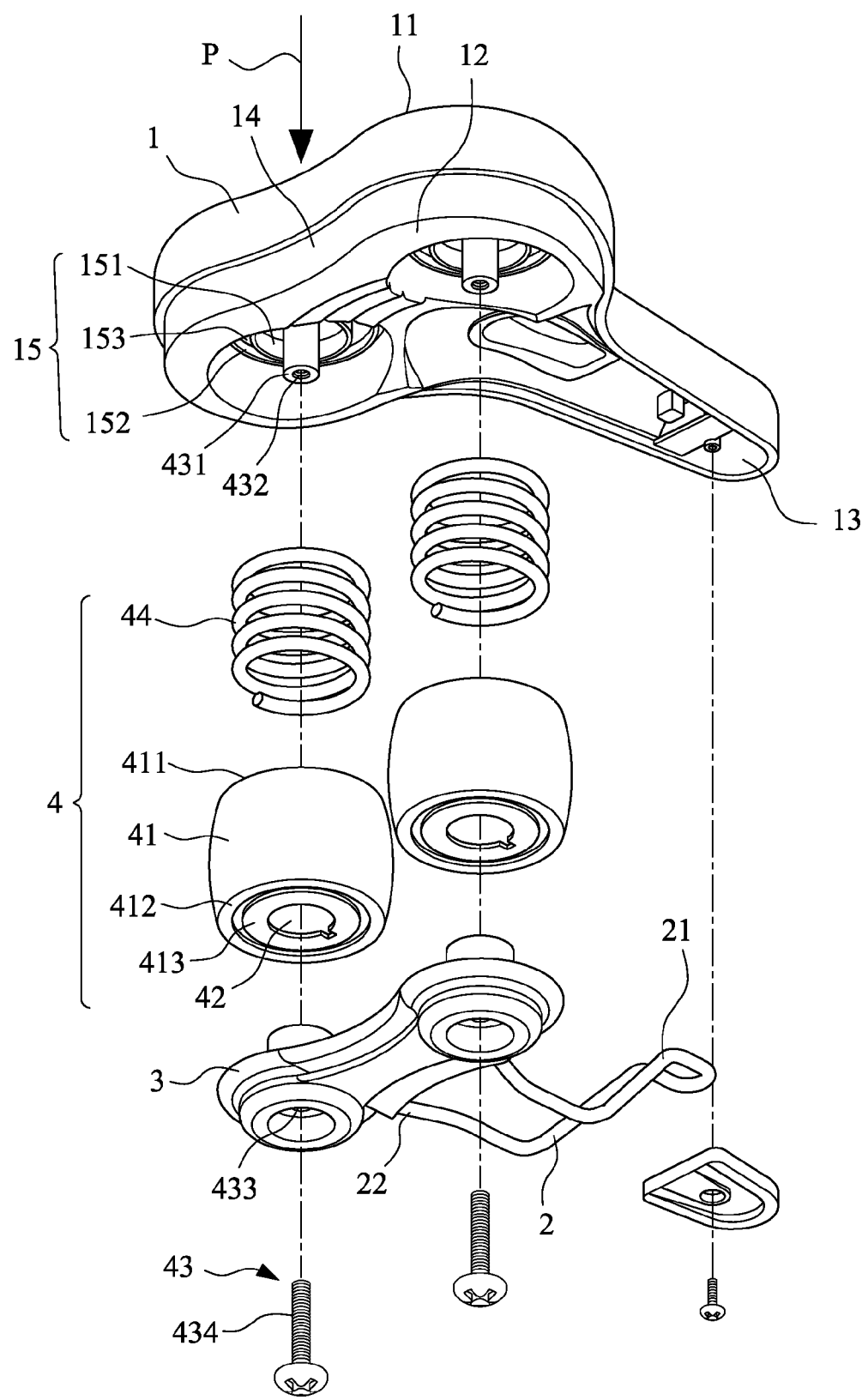
FIG. 3 is a bottom-side exploded view of the present invention.

Referring to FIGS. 1-3, a bike saddle 1 is shown, having a sitting side 11 and a bottom side 12. A bracket 2 has a front end 21 coupled to a bottom front end 13 of the saddle 1 and the bracket 2 has a rear end 22 coupled to a support base 3. A pair of compound vibration-absorption units 4 are coupled between the support base 3 and a bottom rear end 14 of the saddle 1.

Each of the compound vibration-absorption units 4 comprises an exterior enclosure barrel 41 and an interior elastic component 44, wherein the interior elastic component 44 is received and housed in the exterior enclosure barrel 41. The exterior enclosure barrel 41 is formed of one of rubber materials or plastic materials. The interior elastic component 44 comprises a helical coil spring.

The interior elastic component 44 and the exterior enclosure barrel 41 can be combined together to form a compound vibration-absorption unit 4 in the form of a combined, unitary module to ease subsequent assembly operations, or they can alternatively manufactured as separate components that are assembled subsequently to form a compound vibration-absorption unit 4.

Figure 4:
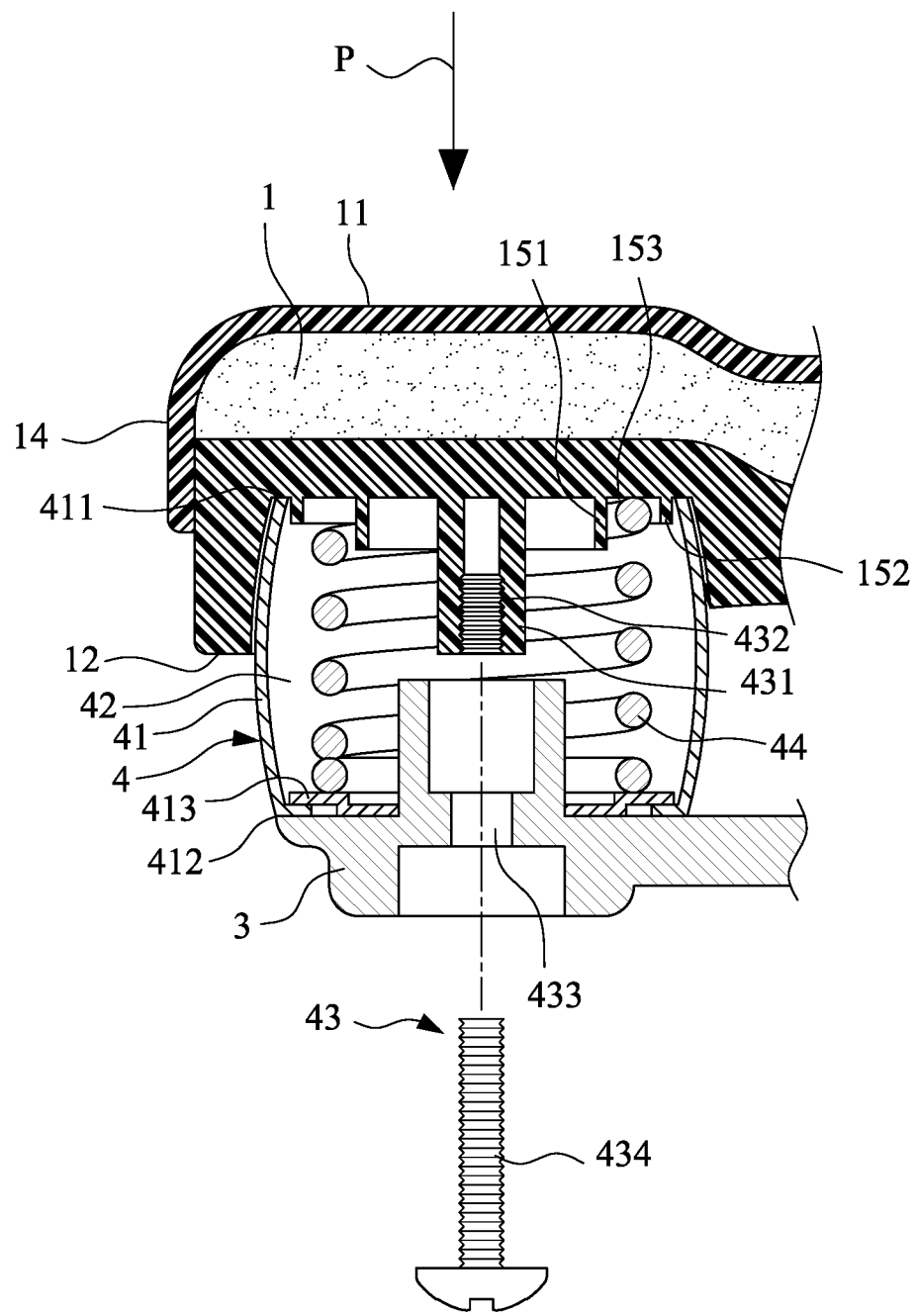
FIG. 4 is a cross-sectional view taken along lines A-A of FIG. 1, showing that a compound vibration-absorption unit of the present invention is mounted between a support base and a saddle.

Referring also to FIG. 4, the exterior enclosure barrel 41 comprises a hollow interior space 42, a first open end 411, and a second open end 412. A force applying direction P is defined extending from the first open end 411 to the second open end 412 of the exterior enclosure barrel 41. The interior elastic component 44 is received and retained in the interior space 42 of the exterior enclosure barrel 41 along the force applying direction. The first open end 411 of the exterior enclosure barrel 41 is positioned against and abuts an abutting zone 15 formed at the bottom rear end 14 of the saddle 1, and the second open end 412 of the exterior enclosure barrel 41 is positioned on the support base 3.

The abutting zone 15 of the saddle 1 comprises an inner annular wall 151 and an outer annular wall 152. The outer annular wall 152 is formed along an outer circumference of the inner annular wall 151, and an annular positioning trough 153 is formed between the outer circumference of the inner annular wall 151 and the outer annular wall 152. The interior elastic component 44 has an end (top end) received and retained in the annular positioning trough 153, and the exterior enclosure barrel 41 has an end (top end) positioned around and abutting an outer circumference of the outer annular wall 152.

The compound vibration-absorption units 4 are each positioned and coupled between the abutting zone 15 of the saddle 1 and the support base 3 by means of a coupling assembly 43. The coupling assembly 43 comprises: a projection post 431, which is formed in the abutting zone 15 of the saddle 1 and projects downward between, with a threaded hole 432 formed in the projection post 431; a through hole 433, which is formed in the support base 3 and corresponds to the projection post 431; and a fastener 434, which is received through the through hole 433 to screw and thus fasten to the threaded hole 432 of the projection post 431 in order to securely position and retain the compound vibration-absorption unit 4 between the support base 3 and the abutting zone 15 of the saddle 1.

In a preferred embodiment, the second open end 412 of the exterior enclosure barrel 41 is combined with an abutting ring 413. The interior elastic component 44 is positioned and retained between the abutting zone 15 of the saddle 1 and the abutting ring 413.

Figure 5:
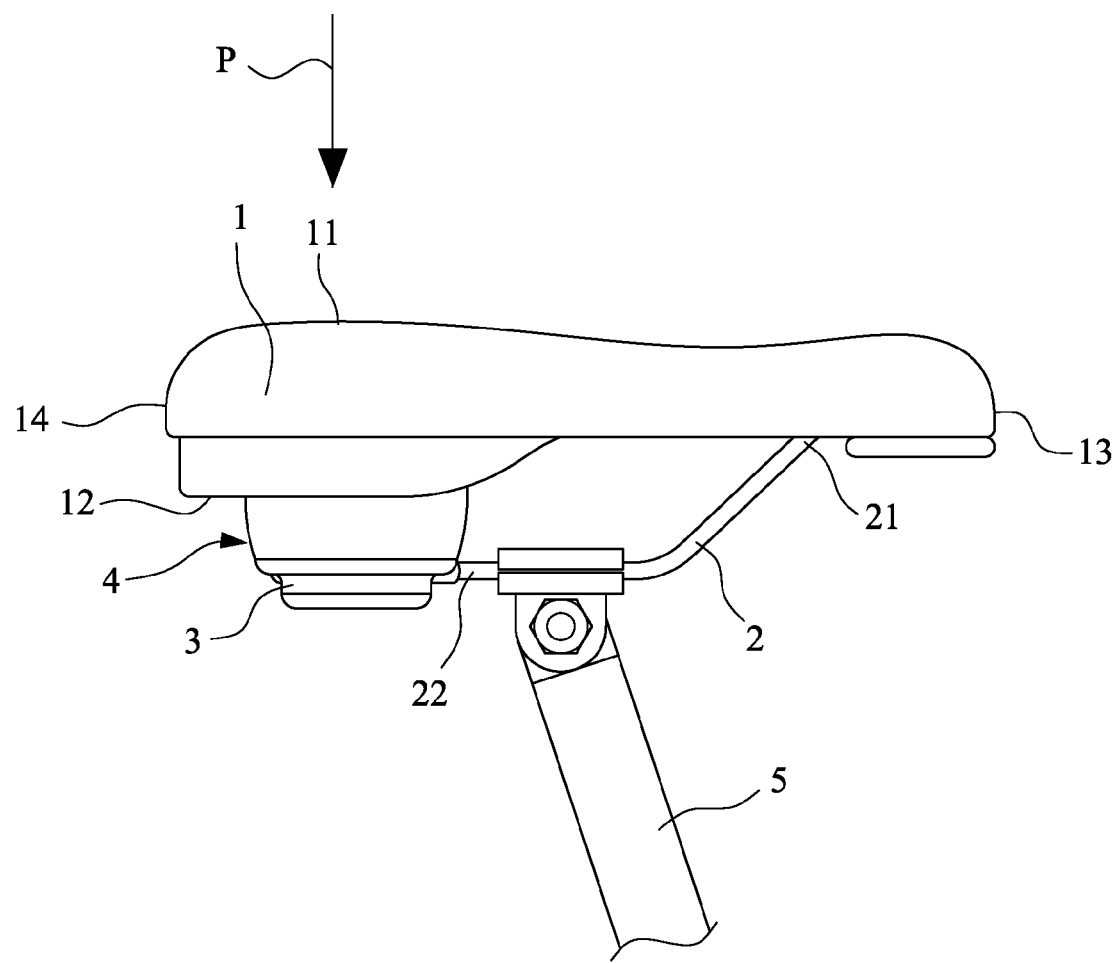
FIG. 5 is a side-elevational view showing that the compound vibration-absorption units of the present invention are mounted to a bike saddle and then coupled to an upright post of a bike.

Referring to FIG. 5, a side-elevational schematic view is provided to illustrate the compound vibration-absorption units 4 of the present invention are mounted to a bike saddle 1 and then coupled to an upright post 5 of a bike. When the sitting side 11 of the saddle 1 receives a force applied in the force applying direction P, a part of the force is absorbed and carried by the interior elastic component 44, while, at the same time, a remaining part of the force is absorbed and carried by the exterior enclosure barrel 41. In an actual condition of use, the capability of the interior elastic component 44 for absorbing and carrying an external force can be arranged to be substantially identical to, greater than, or less than the capability of the exterior enclosure barrel 41 for absorbing and carrying an external force.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A compound vibration absorption assembly for a bike saddle, the bike saddle having a sitting side and a bottom side, and the compound vibration absorption assembly comprising:
    a bracket having a front end and a rear end, the front end of the bracket being coupled to a bottom front end of the bike saddle;
    a support base, the rear end of the bracket being coupled to the support base; and
    a pair of compound vibration-absorption units coupled between the support base and a bottom rear end of the saddle, each of the compound vibration-absorption units including:
        an exterior enclosure barrel having a hollow interior space, a first open end, and a second open end, wherein the first open end and the second open end define a force applying direction therebetween, the first open end being abutted against an abutting zone formed at the bottom rear end of the saddle, and the second open end being positioned on the support base; and
        an interior elastic component received and housed in the interior space of the exterior enclosure barrel along the force applying direction;
    wherein responsive to a force applied to the sitting side of the saddle in the force applying direction, a part of the force is absorbed by the interior elastic component and a remaining part of the force is simultaneously absorbed by the exterior enclosure barrel; and
    the abutting zone of the saddle including an inner annular wall and an outer annular wall formed along an outer circumference of the inner annular wall, an annular positioning trough formed between the outer circumference of the inner annular wall and the outer annular wall, the interior elastic component having an end received and retained in the annular positioning trough, and the exterior enclosure barrel having an end positioned around and abutting an outer circumference of the outer annular wall.

2. The compound vibration absorption assembly as claimed in claim 1, wherein each of the compound vibration-absorption units is positioned and coupled between the abutting zone of the saddle and the support base by a coupling assembly, the coupling assembly including:
    a projection post formed in and projecting from the abutting zone of the saddle, the projection post having a threaded hole formed therein;
    a through hole formed through the support base and corresponding to the projection post; and
    a fastener received in the through hole to thereby engage the threaded hole of the projection post to securely position and retain the compound vibration-absorption unit between the support base and the abutting zone of the saddle.

3. The compound vibration absorption assembly as claimed in claim 1, wherein the interior elastic component includes a helical coil spring.

4. The compound vibration absorption assembly as claimed in claim 1, wherein the second open end of the exterior enclosure barrel includes an abutting ring, the interior elastic component being supported between the abutting zone of the saddle and the abutting ring.

5. The compound vibration absorption assembly as claimed in claim 1, wherein the exterior enclosure barrel is formed by either one of a rubber material or a plastic material.

* * * * *